Feb. 26, 1963  J. H. DE LACY  3,078,754
DRIVE SOCKET INSERT FOR BOLT HEADS HAVING TAPERED
CONICAL SURFACE TO MATCH BOLT
Filed Feb. 1, 1960
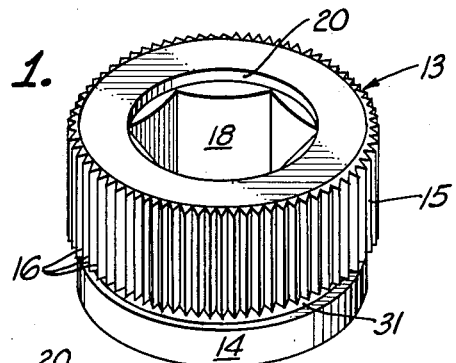
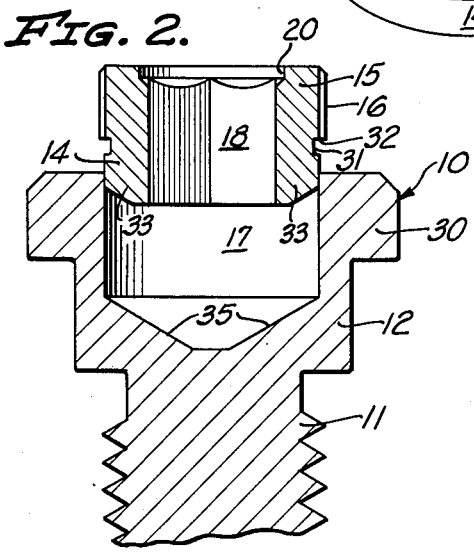
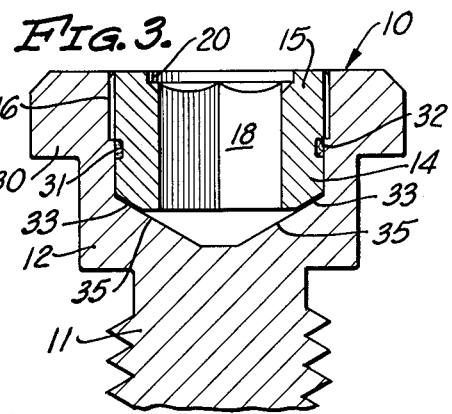
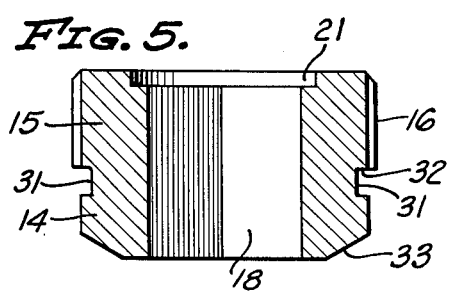
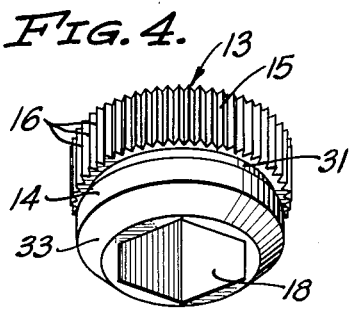
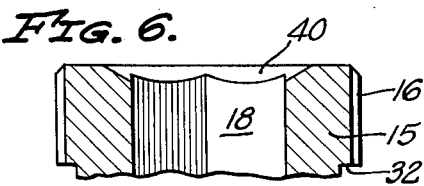
INVENTOR.
JOSEPH H. DeLACY
BY Robert C. Comstock
ATTORNEY

United States Patent Office 3,078,754
Patented Feb. 26, 1963

3,078,754
DRIVE SOCKET INSERT FOR BOLT HEADS HAVING TAPERED CONICAL SURFACE TO MATCH BOLT
Joseph H. De Lacy, Los Angeles, Calif.
(1785 Monrovia Ave., Costa Mesa, Calif.)
Filed Feb. 1, 1960, Ser. No. 5,710
3 Claims. (Cl. 85—45)

This invention relates to a drive socket insert for the heads of screws, bolts and fastening members. This application is a continuation-in-part of my application Serial No. 673,439, now Patent No. 2,931,265, filed July 22, 1957. The construction shown in the present application represents an improvement upon that disclosed in my prior application.

In the manufacture of fastening members of the type adapted to use my insert and particularly shoulder screws of the type shown in the drawings herein, it is often desirable to keep both the length and diameter of the head to a minimum. Since my insert fits within the head of the fastening member, its dimensions must likewise be held to a minimum. At the same time, however, the insert should have sufficient strength so that in case excessive force is applied, the key or driving member will fail by bending or shearing off before the insert or fastening member is damaged.

Since the strength of the insert can be increased only by increasing its length or its diameter, a problem necessarily arises as to how this can be accomplished without simultaneously increasing either the length or the diameter of the head of the fastening member or the length or diameter of the opening in which the insert fits. Since the insert receiving opening is formed by a drill, its inner end is beveled in conformity with the end of the drill. It is an object of the present invention to increase the length of the insert and thus increase its strength and resistance to excessive force by providing an added portion at the inner end of the insert which is beveled at substantially the same angle as the inner end of the opening so that the beveled end portion of the insert fits within the beveled inner end of the opening. The strength of the insert can thus be increased without altering any of the dimensions of the head or the insert receiving opening.

In the manufacture of fastening members and particularly those which are used to pivot a swinging lever, it is often necessary to hold the diameter of the head or shoulder portion of the head to a close tolerance. Tolerances of .0001 inch are not unusual in such diameters. It is accordingly essential that the insert should not increase the diameter of the head or shoulder when it is driven into position.

In order to prevent the diameter of the head or shoulder from being increased, it is accordingly essential that all bulging be avoided when the insert is pressed into the opening. This can be accomplished only if the insert is pressed into place by cutting the walls of the insert receiving opening rather than bulging them. In order to accomplish this, the leading or inner edge of the knurled or gripping portion of the insert must provide a cutting face which confronts the peripheral edge of the opening. The gripping portion of the insert will thus cut through the wall of the opening as the insert is pressed into the opening.

Since a cutting action takes place, chips are necessarily produced. If some provision is not made for accommodating these chips, they will accumulate between the insert and the fastening member and will cause undesirable bulging of the head and/or shoulder portion of the fastening member. It is accordingly an object of my invention to provide a cutting face on the gripping portion of the insert and to provide means for accommodating the chips which are cut from the fastening member.

Both of these results are accomplished simultaneously by providing an annular inwardly directed groove in the insert directly adjacent to the inner end of the gripping portion of the insert. The upper edge of the groove extends radially inwardly at substantially a right angle to the knurled portion of the insert and thus provides a cutting face which confronts the peripheral edge of the opening. The open portion of the groove provides a free space between the gripping portion and the pilot portion of the insert in which the chips can accumulate to prevent them from causing the head to bulge.

The hexagonal or similarly irregularly shaped socket which is provided by my insert is sometimes difficult to use, particularly when visual observation is difficult or impossible, such as when fastening members are located in dark or visually inaccessible places. It is difficult to insert the key in the socket because three types of alignment must occur simultaneously before the key can be properly fitted within the socket. The first type of alignment, which may be called center alignment, requires that the center of the key be aligned with the center of the socket. This alignment is two dimensional. The second alignment, which may be called axial alignment, requires that the axis of the key be aligned with the axis of the socket; the key cannot be tipped or canted with respect to the socket. The third alignment, which may be called angular alignment, requires that the faces of the key be angularly aligned with the faces of the socket. The key must ordinarily be rotated a short distance in one direction or the other in order to accomplish this alignment.

It is an object of my invention to simplify the utilization of the socket by providing improved means for properly orienting the key with respect to the socket, particularly where visual observation is difficult or impossible. In order to accomplish this, I provide a shallow counterbore at the upper or outer end of the recess, the diameter of such counterbore being only slightly greater than the maximum diameter of the key. The counterbore is thus adapted to easily receive the end of the key and guide it to a position in which the axes of the key and socket are aligned. The key is then rotated to align it angularly with the socket and complete the insertion.

It is accordingly an object of my invention to provide a drive socket insert of the type described having the advantages and benefits set forth above. My invention also comprises such other objects, advantages and capabilities as will later more fully appear and which are inherently possessed by my invention.

While I have shown in the accompanying drawings preferred embodiments of my invention, it should be understood that the same are susceptible of modification and change without departing from the spirit of my invention.

Referring to the drawings, FIG. 1 is an isometric view of my insert, taken from above;

FIG. 2 is a sectional view of my insert being inserted into an opening in a shoulder screw;

FIG. 3 is a sectional view of my insert in fully inserted position in a shoulder screw;

FIG. 4 is an isometric view of my insert, taken from below;

FIG. 5 is a sectional view of another embodiment of my insert in which the counterbore has a flat bottom as when formed with a counterboring tool;

FIG. 6 is a sectional view of still another embodiment of my insert in which the counterbore is formed as with a countersinking tool.

A preferred embodiment which has been selected to illustrate my invention is adapted to be used in combination with a fastening device such as a shoulder screw 10 having a round screw-threaded shank 11, a shoulder 12 of larger diameter than the shank 11 and a head 30 of larger diameter than the shoulder 12. My insert 13 is provided with a pilot portion 14 having a round smooth surface and an adjacent gripping portion 15. The gripping portion 15 is provided with a plurality of knurls or serrations 16, which extend around its entire periphery. In the embodiment shown, the serrations 16 are formed in the manner of triangular teeth, although other suitable types of knurling or serrations may be used with equal effectiveness. The outer diameter of the serrations 16 slightly exceeds that of the pilot portion 14. The pilot portion 14 and gripping portion 15 may be integral parts of a single member or may be separate members which are joined together to form my insert 13.

The insert 13 is provided with an inwardly directed annular groove 31, which is disposed between the pilot portion 14 and gripping portion 15. The upper edge 32 of the groove 31 extends radially inwardly substantially transversely to the gripping portion in order to provide a right angular cutting face along the lower or inner edge of the gripping portion 15.

In order to adapt the screw 10 for the use of my insert 13, a round opening 17 is drilled in the head 30 from the top downwardly along the longitudinal axis of the screw 10. The opening 17 should be of sufficient size to receive the pilot portion 14 with a minimum of play. It is contemplated that the size of the pilot portions 14 of my inserts 13 should preferably correspond to the size of drills which are in conventional use. The bottom or inner end of the opening 17 is beveled at 35 in a manner corresponding to the bevel at the end of the drill used to form the opening 17.

After the opening 17 has been drilled, the pilot portion 14 of the insert 13 is placed within the opening 17. Pressure is then applied to the end of the gripping portion 15 and/or the screw 10 through the use of a vise, arbor press or other suitable means to press the gripping portion 15 into the opening 17. The length of the opening 17 should preferably slightly exceed the length of the insert 13, so that the pressure can be continued until the outer end of the gripping portion 15 is substantially flush with the top of the head 30.

As the insert 13 is pressed into the opening 17, the cutting face 32 confronts the peripheral edge of the opening 17 and the serrations 16 cut the peripheral edge of the opening 17. The insert 13 can thus be inserted into the opening 17 without bulging or increasing the diameter of the head 30 or shoulder 12 of the screw 10. The groove 31 provides an open area which is capable of receiving and holding the cuttings so that they do not accumulate between the insert 13 and the screw 10.

The insert 13 is provided at its lower or inner end with a beveled portion 33, the bevel of which substantially corresponds to the bevel 35 of the opening 17. As described earlier in this application, the addition of the beveled portion 33 increases the strength of the insert 13 without increasing the diameter or length of the head 30, shoulder 12 or opening 17.

The insert 13 is provided with a recess 18, which in the embodiment shown in the drawings, is hexagonal in shape and extends for the entire length of the insert 13. It is anticipated, however, that any desired conventional shape may be used, such as square, triangular, pentagonal, cross-slot, clutch head, spline head, etc. The insert 13 may also be provided with a recess 18 having any desired unique shape. While it is customarily easier to form my insert so that the recess 18 extends for its entire length, this is not essential to the operation of my device. It is sufficient for the recess to extend inwardly from the top of the head far enough to receive and permit effective use of the cooperating driving member.

In order to simplify and expedite use of the recess 18, the top of the insert 13 is provided with an annular counterbore 20 which has a diameter only slightly exceeding the maximum diameter of the recess 18. The counterbore 20 concentrically surrounds the recess 18 and extends inwardly at substantially a right angle from the outer end or top of the insert 13.

The counterbore 20 has a diameter only slightly greater than that of the operating or driving key which is inserted into the recess 18 in order to drive the screw 10. The end of the key will fit into the counterbore more easily than it will fit into the recess 18 because a definite angular relationship between them is not necessary. The end of the key can be inserted into the counterbore by "feel," where the head of the screw cannot be seen. The reception of the end of the key within the counterbore 20 means that the centers of the key and the recess 18 are aligned. The wall of the counterbore 20 will orient the key so that its axis is aligned with the axis of the recess 18 and all that remains is for the operator to rotate the key a slight amount in either direction in order to align its faces with those of the recess 18 so that the key can be inserted into the recess 18.

FIG. 5 of the drawings shows an alternative embodiment in which the counterbore 21 is formed as with a counterboring tool as oposed to the drill used to form the counterbore 20 shown in FIGS. 1–3 of the drawings. FIG. 6 of the drawings shows another alternative embodiment in which a countersink 40 is formed as with a countersinking tool.

It will be noted that the pilot portion fits within the opening in the fastening member to act as a guide and prevent tipping and canting of the insert with respect to the fastening member when pressure is applied. The knurls or serrations cut their way into the sides of the opening to prevent the insert from rotating within the opening or coming out the end of the opening. The hold established between the gripping portion of the insert and the screw is sufficient to avoid any displacement of the insert during repeated driving of the screw in either direction.

In use, my insert provides all of the advantages and benefits of a conventional one piece screw having a recessed head. This result is obtained, however, at far less cost than forming such a recess in the head of a special screw and even at less cost than a mere slotting operation.

I claim:

1. A rotatable fastening member, said fastening member having an opening extending downwardly from the top thereof with a configuration similar to that formed by a conventional drill, said opening having a beveled portion at the inner end thereof, an insert permanently mounted in said opening to provide a non-round recess within the top of said fastening member for removably receiving a driving member to rotatably drive said fastening member, said insert having a gripping portion, said gripping portion having knurled gripping means, the outer dimension of the outer portions of said gripping means being slightly greater than the inner dimension of the adjacent portions of said opening so that said gripping means can cut into the inner walls of said opening to permanently mount and hold said insert against removal or rotation with respect to said fastening member, said insert having a beveled portion at the inner end thereof formed complementarily to and fitting within the beveled portion of said opening, said insert having a pilot portion disposed beneath said gripping portion, said pilot portion comprising a substantial portion of the length of the insert having an outer dimension slightly smaller than the inner dimension of the adjacent portion of said opening, said pilot portion being dimensioned to fit within said opening to hold said insert in substantially non-tiltable position with respect to said fastening member, whereby said insert may be pressed into position within said opening, said insert having an annular groove disposed between said gripping portion and said pilot portion, the edge of said groove which is adjacent to said gripping portion extending radially inwardly to provide a substantially right angular cutting edge confronting the peripheral edge of said recess to facilitate the insertion of said insert into said opening, said groove receiving and holding chips cut from the wall of said opening upon the insertion of said insert, said insert having a non-round recess extending therethrough for removably receiving the tip of a driving member to drive said fastening member, the top of said insert having a circular counterbore extending downwardly from the top thereof concentrically surrounding said recess, the diameter of said counterbore being substantially equal to the maximum diameter of said recess, said counterbore being adapted to guide the tip of the driving member toward proper position for insertion into said recess.

2. A rotatable fastening member, said fastening member having an opening extending downwardly from the top thereof with a configuration similar to that formed by a conventional drill said opening having a beveled portion at the inner end thereof, an insert permanently mounted in said opening to provide a non-round recess within the top of said fastening member for removably receiving a driving member to rotatably drive said fastening member, said insert having a gripping portion, said gripping portion having knurled gripping means, the outer dimension of the outer portions of said gripping means being slightly greater than the inner dimension of the adjacent portions of said opening so that said gripping means can cut into the inner walls of said opening to permanently mount and hold said insert against removal or rotation with respect to said fastening member, said insert having a beveled portion at the inner end thereof formed complementarily to and fitting within the beveled portion of said opening, said insert having a pilot portion disposed beneath said gripping portion, said pilot portion comprising a substantial portion of the length of the insert having an outer dimension slightly smaller than the inner dimension of the adjacent portion of said opening, said pilot portion being dimensioned to fit within said opening to hold said insert in substantially non-tiltable position with respect to said fastening member, whereby said insert may be pressed into position within said opening, said insert having a non-round recess extending therethrough for removably receiving the tip of a driving member to drive said fastening member, the top of said insert having a circular counterbore extending downwardly from the top thereof concentrically surrounding said recess, the diameter of said counterbore being substantially equal to the maximum diameter of said recess, said counterbore being adapted to guide the tip of the driving member toward proper position for insertion into said recess.

3. A rotatable fastening member, said fastening member having an opening extending downwardly from the top thereof with a configuration similar to that formed by a conventional drill said opening having a beveled portion at the inner end thereof, an insert permanently mounted in said opening to provide a non-round recess within the top of said fastening member for removably receiving a driving member to rotatably drive said fastening member, said insert having a gripping portion, said gripping portion having knurled gripping means, the outer dimension of the outer portions of said gripping means being slightly greater than the inner dimension of the adjacent portions of said opening so that said gripping means can cut into the inner walls of said opening to permanently mount and hold said insert against removal or rotation with respect to said fastening member, said insert having a beveled portion at the inner end thereof formed complementarily to and fitting within the beveled portion of said opening, said insert having a pilot portion disposed beneath said gripping portion, said pilot portion comprising a substantial portion of the length of the insert having an outer dimension slightly smaller than the inner dimension of the adjacent portion of said opening, said pilot portion being dimensioned to fit within said opening to hold said insert in substantially non-tiltable position with respect to said fastening member, whereby said insert may be pressed into position within said opening, said insert having a non-round recess extending therethrough for removably receiving the tip of a driving member to drive said fastening member.

References Cited in the file of this patent

UNITED STATES PATENTS

| | | |
|---|---|---|
| 1,765,614 | Roberts | June 24, 1930 |
| 2,556,155 | Stellin | June 5, 1951 |
| 2,728,370 | Neuschotz | Dec. 27, 1955 |
| 2,931,265 | De Lacy | Apr. 5, 1960 |